United States Patent
Mariller et al.

(10) Patent No.: US 9,933,248 B2
(45) Date of Patent: Apr. 3, 2018

(54) HEIGHT GAUGE

(71) Applicant: TESA SA, Renens (CH)

(72) Inventors: Serge Mariller, Chéseaux-sur-Lausanne (CH); Sebastien Granges, Lausanne (CH)

(73) Assignee: TESA SA, Renens (CH)

( * ) Notice: Subject to any disclaimer, the term of this patent is extended or adjusted under 35 U.S.C. 154(b) by 127 days.

(21) Appl. No.: 15/215,431

(22) Filed: Jul. 20, 2016

(65) Prior Publication Data

US 2018/0023945 A1    Jan. 25, 2018

(51) Int. Cl.
*G01B 11/00* (2006.01)
*G01B 11/06* (2006.01)

(52) U.S. Cl.
CPC ................. *G01B 11/0608* (2013.01)

(58) Field of Classification Search
CPC ........ G01B 5/18; G01B 11/306; G01B 21/18; G01B 3/08; G01B 5/0002; G01B 5/061; G01B 5/063; G01B 11/0608
USPC .......................................................... 33/832
See application file for complete search history.

(56) References Cited

U.S. PATENT DOCUMENTS

| | | | | |
|---|---|---|---|---|
| 3,811,192 A | * | 5/1974 | Christensen | G01B 5/061 33/838 |
| 4,458,423 A | * | 7/1984 | Sakata | B25H 7/00 33/832 |
| 4,521,967 A | * | 6/1985 | Uchino | G12B 3/02 33/832 |
| 4,679,326 A | * | 7/1987 | Takizawa | G01B 7/002 33/832 |
| 6,813,845 B2 | | 11/2004 | Jordil et al. | |
| 7,263,786 B1 | * | 9/2007 | Zanier | G01B 5/061 33/832 |
| 7,992,314 B2 | | 8/2011 | Strack et al. | |
| 8,109,008 B1 | * | 2/2012 | Niemczak | A61B 5/1072 33/512 |
| 2003/0106235 A1 | * | 6/2003 | Jordil | B23Q 1/0054 33/832 |
| 2003/0106236 A1 | * | 6/2003 | Jordil | G01B 3/008 33/832 |
| 2005/0155246 A1 | * | 7/2005 | Montagnino | A61B 5/0537 33/832 |
| 2006/0137204 A1 | * | 6/2006 | Yang | G01B 7/082 33/832 |
| 2006/0191154 A1 | * | 8/2006 | Kraemer | G01B 5/061 33/832 |
| 2007/0245586 A1 | * | 10/2007 | Zanier | G01B 5/061 33/832 |
| 2010/0287786 A1 | * | 11/2010 | Biselx | G01B 5/008 33/832 |

FOREIGN PATENT DOCUMENTS

DE     41 38 227 A1    6/1992

\* cited by examiner

*Primary Examiner* — Yaritza Guadalupe-McCall
(74) *Attorney, Agent, or Firm* — Maschoff Brennan

(57) ABSTRACT

A height gauge, comprising: a sliding support moving along a vertical guide and carrying a contact feeler, and a multichromatic light-emitting device mounted on the sliding support. A programmable controller drives the light-emitting device based on the position of the feeler.

13 Claims, 3 Drawing Sheets

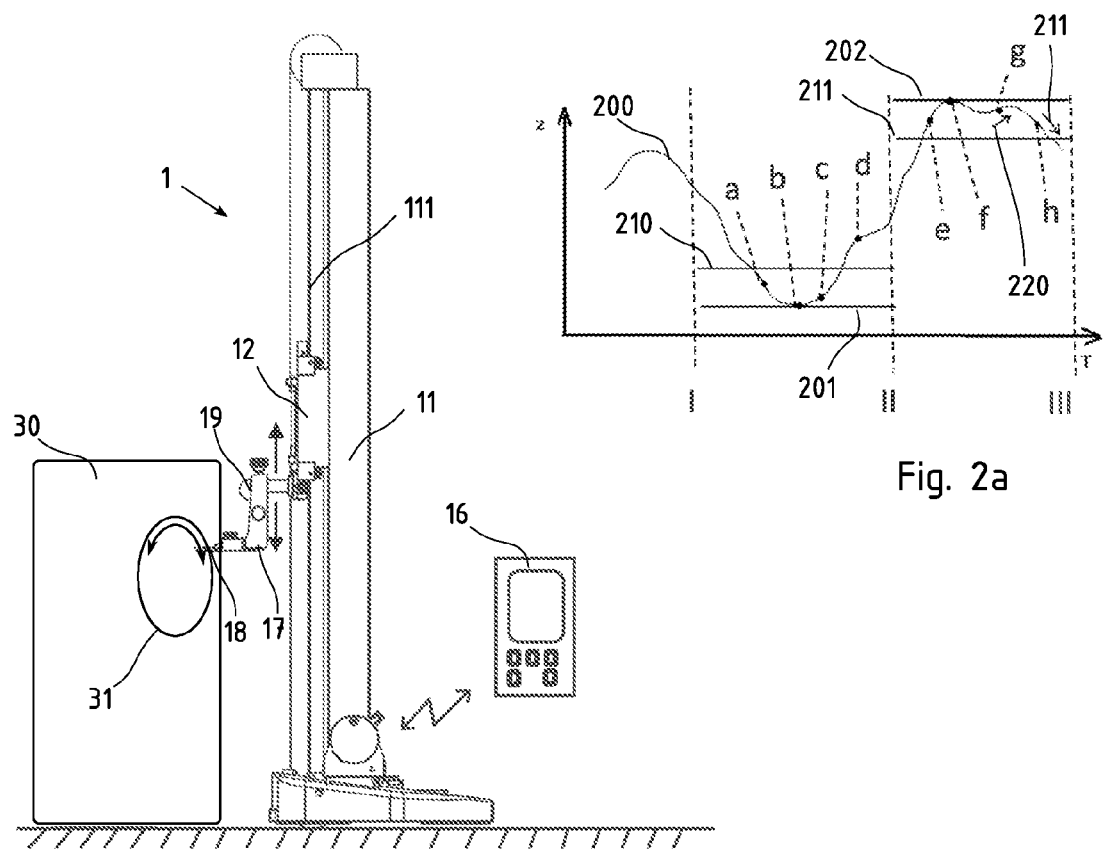
Fig. 2
Fig. 2a
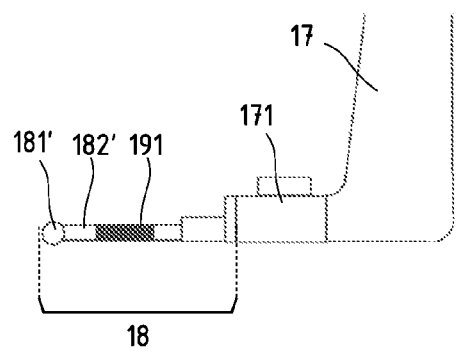
Fig. 3
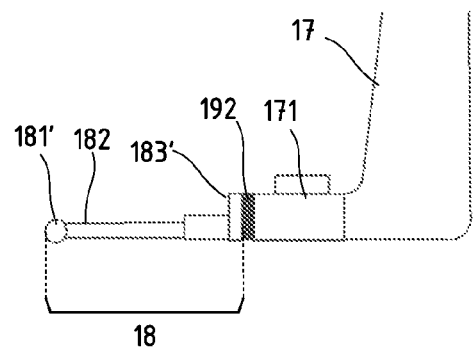
Fig. 4

HEIGHT GAUGE

FIELD OF THE INVENTION

The present invention concerns dimension-measuring instruments and in particular, but not exclusively, a height gauge with a single vertical measure and displacement axis.

DESCRIPTION OF RELATED ART

Height gauges are frequently used in mechanical workshops and industry for measuring vertical coordinates of workpieces, in particular for measuring the positions and diameters of recesses of the workpiece.

Known height gauges are configured to be placed on a horizontal reference surface and have a vertical guide of height comprised between 50 centimetres and 2 meters. The vertical guide slideably supports a probe tip or feeler for detecting a contact with the workpiece. Height gauges are further equipped with a position encoder for acquiring the position of the feeler on the vertical guide with high accuracy. The height of the feeler can be determined with a precision of the order of one micrometer in the best instruments.

The operator must place the workpiece close to the height gauge and adjust it on the horizontal reference surface so that the probe tip can be displaced vertically to contact the portion of the workpiece whose vertical coordinate the operator wishes to measure. Height gauges can be mounted on an air-cushion base that facilitates their horizontal displacements.

Known height gauges are often provided with a display for showing operator's commands and acquired measurements, such as the absolute height of a point or the difference between two measured points. However, handling the workpiece and watching the displaying device is not very intuitive for the operator as his eyes must leave the workpiece for reading the visual information on the displaying device.

U.S. Pat. No. 6,813,845 discloses a height gauge provided with an acoustic device for signaling an acquisition of an extrema position of the probe tip during a measure operation.

DE4138227 discloses a height gauge provided with an LED attached on a side of the column for signaling a physical contact between the probe and a workpiece to be measured.

U.S. Pat. No. 7,992,314 discloses a measuring column with a signaling device for indicating the status of the automatic command recognition and measurement function initiation. The signaling device is attached to the movable measuring slide and is in the form of either an acoustic device or a plurality of distinct, single lights that can be turned on/off or flash.

BRIEF SUMMARY OF THE INVENTION

The aim of the invention is to provide a height gauge with an improved support to the operator in measuring operations with respect to known height gauges.

According to the invention, this aim is achieved by means of the height gauge of claim 1.

This solution provides, in particular, a height gauge guiding the operator in measuring extremities of cavities or holes of workpieces without distracting him from the handling of the workpiece.

This solution further provides a height gauge able to guide the operator in complex measuring operations in noisy environments, such as machine shops and industrial environments.

BRIEF DESCRIPTION OF THE DRAWINGS

The invention will be better understood with the aid of the description of an embodiment given by way of example and illustrated by the figures, in which:

FIGS. 1, 2 and 2a show views of a height gauge according to the invention;

FIGS. 3 and 4 show details of a second and a third embodiment of a height gauge according to the invention;

DETAILED DESCRIPTION OF POSSIBLE EMBODIMENTS OF THE INVENTION

Figure 1:
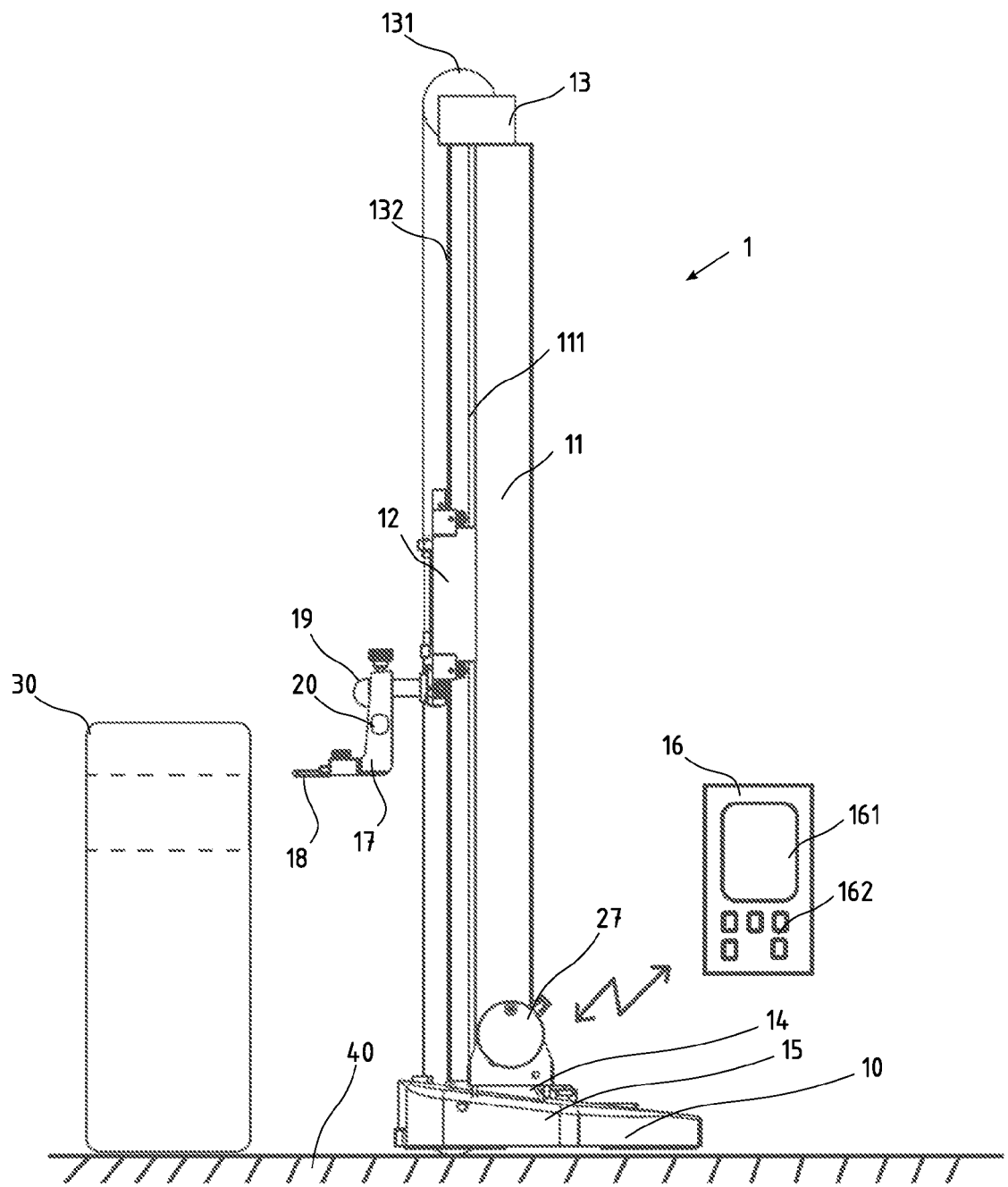

FIGS. 1, 2, and 2a show a height gauge 1 in the form of a dimension-measuring column having a single vertical axis for determining a coordinate point along the vertical axis.

The height gauge 1 comprises a base 10 for resting on a reference surface 40 that is generally a horizontal surface. Advantageously, the base 10 can comprise means for facilitating a horizontal displacement of the height gauge 1 on the reference surface, e.g. air-cushions.

A column 11 rigidly attached to the base 10 extends substantially vertically therefrom. The column 11 comprises a vertical guide 111 slideably supporting a moveable member 12 having a feeler 18 for detecting a contact with a workpiece 30, which is configured to cooperate with the moveable member 12 to permit a linear translation of the moveable member along a vertical axis, perpendicular with respect to the reference surface.

The moveable member 12 supports the feeler 18 by means of a feeler support 17.

The feeler 18 may be a touch probe having a stylus 182 having a contact element (e.g. a ruby ball 181) at its distal extremity for contacting a surface of a workpiece. The feeler is preferably provided at its proximal extremity with a connector 183 cooperating with a matching element 171 of the probe support 17, for removeably attaching the feeler thereto.

The height gauge 1 comprises a position encoder 15 generating a signal representing the position of the feeler 18 on the vertical guide. The encoder may deliver an analogue signal and/or a digital one. The accuracy of the encoder is dictated by the accuracy of the instrument which may approach the micrometer in the best cases.

Preferably, the instrument 1 of the invention is motorized: it comprises a motor or an actuator 13, and an electronic control unit 14 for driving it. The actuator 13 may operate on the moveable member 12 by pulley, cables, or any suitable transmission 131, 132. However non-motorized embodiments are also possible where the operator drives the moveable member 12 manually by rotating a knob 27 near the base. On a motorized instrument the rotary knob 27 can be configured to control the actuator according to the manual cues provided by the operator, in particular for direction and speed.

The electronic control unit 14 is preferably configured for acquiring the encoder's signal representing the position of the feeler, for driving the moveable member 12 along the vertical guide in a closed-loop control mode (i.e. feedback mode), for receiving inputs from the interface elements, and for returning information to the operator.

The electronic control unit 14 comprises a logic or programmable electronic circuit, programmed to operate the height gauge according to a plurality of measure modes, preferably including measure modes for measuring a single point on a workpiece's surface and measure modes for measuring an extremal point. Measure modes can be selected and controlled by the operator, acting on either the user interface 16, the rotary knob 27, or another suitable manual input device.

The user interface 16 may comprise a keyboard 162 and a display 161, and may be connected with the electronic control 14 unit by a wired or wireless data channel. The user interface 16 can be physically connected to the height gauge by means of an articulated or flexible arm, connected by a wire thereto, or wholly detached, the communication being assured by a suitable wireless channel.

In a variant, the user interface 16 can be a portable device, such as a smartphone, a tablet or a laptop, configured to communicate with the electronic control unit and execute a suitable application to control the height gauge, to display and to process the acquired data.

The control unit 14 may be programmed to show on the display 161 any relevant information, including: current absolute or relative vertical position of the feeler; computed quantities such as coordinates, distances, radii, diameters, thicknesses, angles, lengths, and so on; operator's command and instructions; menus; status information; guides and instructions to the operator, in textual and/or video format. Advantageously, the screen may be a touch-screen 161 taking over, fully or in part, the functions of the keyboard 162.

The control unit 14 may be programmed to correct the measurements for the relative dilatation of the height gauge and the workpiece depending on the temperature. In known height gauges the temperature and material of the workpiece as well as the temperature of the height gauge are entered manually through the user interface 16. The operator can then activate an application which compensates the measured dimensions for temperature effects.

In a preferred embodiment a temperature sensor 20 can be provided on the probe support, 17, or the moveable member 12. The temperature sensor can be of contact or preferably non-contact (Infrared) type. Configured to be rotatable through 180°, the temperature sensor can be used to measure the temperature of the height gauge and, after rotation through 180°, of the workpiece that is facing it. The measured temperatures are used by the control unit 14 to calculate dimensional corrections based on the temperatures and the coefficients of expansion of the height gauge and the workpiece.

The user interface may comprise a speaker for generating acoustic cues or synthesized vocal messages and/or a microphone for receiving voice commands to be decoded by the electronic control unit 14, and might be connected to a hand control device like a mouse, trackball, or trackpad.

The rotary control knob 27 is preferably located on a side of the column 11, near the base 10, allowing an operator to initiate predefined measure modes, to drive the moveable element, to navigate menus on the display, to set measure parameters and so on, while keeping the measure point within view. Preferably, it comprises a haptic element, for example a vibrating element capable of providing tactile signals to the operator. In non-motorized instruments the rotary knob 27 is used to drive directly the moveable member 12.

Preferably, the electronic control unit is configured to receive a force signal generated by a force sensor (not illustrated), representing a vertical component of a contact force acting between the touch element 181 and the surface of the workpiece when they are in contact. Thanks to this feature, the control unit can validate a measurement (i.e. a position of the feeler on the vertical guide), e.g. when the force magnitude indicated by the force sensor is in a predefined range.

In addition, the force sensor enables a correction mode, wherein the electronic control unit corrects the acquired coordinate position (i.e. the position of the feeler with respect to the vertical guide) depending on the indication of the force sensor. The control unit 14 can be configured to operate the actuator in a constant-force mode in such a way as to maintain the contact force substantially constant (i.e. within a predefined range). The constant-force mode permits the operator to move the workpiece and/or the height gauge on the reference surface while the electronic control unit drives the moveable element maintaining a contact of constant pressure between the feeler and the workpiece and acquiring successive valid positions of the feeler. In manual height gauges, the constant-force mode is achieved by the operator's manipulation of the rotary knob 27.

The electronic control unit has, in particular, an extremal measure mode wherein the electronic control unit detects an extremal position 201, 202, either a minimum or a maximum, in a motion 200 of the feeler relative to the vertical guide, as illustrated in FIGS. 2 and 2a.

When this measure mode is enabled, the control unit acquires a series of successive positions of the feeler and determines a motion 200 of the feeler as a function of the elapsed time. Alternatively, the successive positions of the feeler are constantly acquired and stored in a buffer whenever the height gauge is active, and the control unit will address this buffer to reconstruct the motion profile 200 when necessary.

The motion can be represented by a time series of discrete position, or by an interpolated or fitted line, defined by any suitable parametric function. An extrema-finding algorithm automatically determines the minima 201 and/or the maxima 202 of the motion 200, i.e., the lowest vertical position 201 and/or the highest vertical position 202 of the feeler in a time interval of interest. Preferably, the identification of an extremal point is marked by a suitable audio (beep) or visual cue, as it will be explained in detail later on. The control unit may be programmed to find either local extrema or global extrema in a given time interval. The extrema finding algorithm may be implemented by a program executed by a suitable processor, in a logical circuit or FPGA, or in any other suitable way.

The control unit may be programmed to identify temporary extremal positions in the motion profile 200 that represents a promising candidate for a local extremal position on the workpiece. The temporary extremal position is continuously updated based on the position of the feeler. When the search for an extremum point ends or is terminated, or after a determined time interval, the extremal position is estimated as the last valid temporary extremal position.

In the example illustrated in FIGS. 2 and 2a, the operator selected a minimum measure mode for the time Interval I-II in which the extrema-finding algorithm finds the lowest position 201. The lowest position (i.e. the minimum of the motion) is thus identified as the position of the feeler at Time "b". Thereafter, the operator selected a maximum measure mode for the Time Interval II-III in which the extrema-computing algorithm is programmed to find the highest position in the motion of the feeler during the selected Time interval. The highest position (i.e. the maximum of the motion) 202 is thus identified as the position of the feeler at Time "f".

The height gauge may comprise a complete bore or diameter measurement wherein the height gauge changes, semi- or automatically, from the minimum to the maximal measure mode or/and vice versa.

The extremal position determination can be executed in real time or a posteriori when the extrema-computing algorithm disposes of the entire motion (i.e. after the time period is ended).

Handling the workpiece and watching at the displaying device is not very intuitive for the operator as his eyes must leave the workpiece for reading the visual information on the displaying device. The height gage 1 thus comprises a multi chromatic light-emitting device 19 moveable in synchronization with the feeler and controlled by the electronic control unit for guiding the operator by visual information generated in proximity of the workpiece.

In the extremal measure mode, the electronic control unit supports the operator by driving the multi chromatic light-emitting device depending on the relative position of the feeler with respect to the extremal positions 201, 202 of the motion 200 of the feeler on the vertical guide. It has been found that this manner of operation is more ergonomic, in that the operator does not have to turn his gaze from the measured point, is less distracting, thanks to its conciseness, and is better suited to noisy environments.

In the embodiment of FIGS. 1 and 2, the multi chromatic light-emitting device 19 is mounted on the moveable member 12 so as to move in synchronization with the movement of the feeler 18.

The multi chromatic light-emitting device 19 can be configured to emit any suitable colored light. In the presented examples it is assumed to be capable of emitting light perceived having any of the following perceived colors: red, orange, green, blue, or combinations thereof, including a polychromatic light perceived as white.

In a preferred variant, the multi chromatic light-emitting device 19 can comprise a plurality of light sources, such as light-emitting diodes (LEDs). Possibly, each individual source emits light having a specific spectrum, and the various colors are obtained by suitable weighted combinations.

The intensity, position and direction of the light emitted by the source 19 are preferably adjustable by suitable electronic controls, diaphragms, optical elements, swiveling and/or flexible supports, and/or blinds, either manually, or automatically. The height gauge may include a light detector for adaptively adjusting the intensity to the ambient illumination.

In the extremum measure mode, the electronic control device can be configured to control the direction, the intensity and/or the distribution of the beam illumination of emitted lights as a function of the position and/or of the direction of the feeler with respect to the extremal position. In an exemplary embodiment, the electronic control device can have an automatic mode in which it orients the direction of the emitted light of the multi chromatic light-emitting device towards the extremal position, such that the emitted light shines on the surface of the workpiece to be measured.

According to the invention, the multi chromatic light-emitting device can be located on various components of the height gauge. In one embodiment illustrated by FIG. 3, the multi-chromatic light-emitting device is located in the feeler 18, which has a semi-transparent or a transparent portion through which the light of the source 19 is visible. The semi-transparent or a transparent portion can be part of the stylus 182' and/or the touch element (e.g. the contact ball 181'). According to this variant, the light-emitting device generates luminous information in proximity of the contact points, and therefore will be in the field of view of the operator. Moreover, this solution provides an efficient illumination of the surface of the workpiece wherein a measurement is taking place.

In another embodiment illustrated by FIG. 4, the multi-chromatic light-emitting device is placed in the connector 183' of the feeler 18. The connector 183' comprises an indicator element 192 that is at least partially transparent and arranged for visualizing the emitted light of the chromatic light-emitting device. The indicator element could be a semi-transparent or transparent portion of the connector. The indicator element may be in a semi-transparent or a transparent ring located around the connector and placed near or in contact with the supporting element 171 of the feeler support 17. The ring is removably placed around an elongated, possibly threaded, portion of the support 183' that cooperates with a cavity of the support element of the feeler support.

Alternatively, the multi-chromatic light-emitting device can be placed on the feeler support 17. This embodiment places the luminous information in proximity of contact points in such a way as to guarantee an unmasked visibility even when the operator is measuring holes or bores, particularly with long styli. It has also been found that this variant may be less distracting than the previous one in some circumstances.

In a non-illustrated variant of the invention, the height gauge comprises an additional alphanumeric or graphic display unit on the moveable element 12 and controlled by the electronic control device. The additional display can be controlled to show short alphanumerical messages or symbols that the operator can see without shifting his sight from the measure point. The additional display can be an LCD or an OLED device of small dimensions, such as 1.5-2 inches (3.8 cm-5.1 cm) diagonal display. The information shown thereon can include the vertical position of the feeler, coordinates, and computed dimensions like length, thicknesses, angles, diameters, radii, or the current operating mode, or any other information.

Advantageously, the electronic control unit has a real-time extremal measure mode (minimum and/or maximum), wherein the electronic control unit causes the multi chromatic light-emitting device to generate a visual signal based on the position of the feeler with respect to an extremal position.

Preferably, the delay between the instant at which the feeler passes the extremal point and the visual signal is very short, ideally within a few milliseconds, and is perceived instantaneously by the operator. This greatly facilitates the search of an extremal point and reduces measure errors.

In this mode, the operator is immediately informed, for example during the measurement of a hole, that he is in the vicinity of or at the lowest or the highest point, by a light signal having a determined color, or intensity and/or flashing pattern.

Three indication modes are selectable by the operator:
- a luminous information based on a vertical distance between the position of the feeler and the extremal position (minimum or maximum);
- a luminous information based on a direction of movement of the feeler with respect to the extremal position (minimum or maximum);

a luminous information based on a vertical distance between the position of feeler and the extremal position (minimum or maximum) and on a direction of a movement of the feeler with respect to the extremal position (minimum or maximum).

An exemplary case is illustrated by FIG. 2a, wherein the operator opts for the first option, i.e. a luminous information based on a vertical distance between the position of feeler and the extremal position. The operator activates the real-time minimum measure mode at Time I for finding the height of the lowest point in the bore 31. The extrema-finding algorithm analyzes the motion profile of the feeler 200 received from the position encoder and determines the lowest position.

The extrema-computing algorithm determines thus a temporary lowest position that is continuously updated up to Time b when the temporary lowest position reaches the local minimum 201, whereupon the algorithm determines that the next incoming feeler positions are higher than the temporary lowest position 201. The electronic control device drives the multi chromatic light-emitting device for emitting a first predefined visual signal, e.g. a single blinking light, for informing the operator that a local minimum position is acquired. The luminous signal can be accompanied by a predefined acoustical signal, or by a tactile signal from the control knob.

The electronic control unit generates a threshold 210 whose magnitude is based on the magnitude of the temporary lowest position such as to inform the operator if the position of the feeler is, or is not, in proximity of the temporary lowest position. The threshold value 210 can be generated by adding a predefined offset to the temporary lowest position. The offset can be programmable by the operator. The magnitude of the threshold is preferably updated each time the temporary lowest position is updated.

In a preferred variant, the electronic control unit causes the multi-chromatic light-emitting device 19 to emit a visual color-coded indication of the current height of the feeler relative to the threshold 210, which informs the operator on whether the feeler is momentarily close to an extremal point. The light source could be caused to generate a second predetermined visual signal, for example a fixed orange light, when the height of the feeler is between the extremal value 201 and the threshold 210 (cf. points "a" and "b") and a third visual signal, for example a fixed red light, when the height of the feeler 19 exceeds the threshold 210 (point "d").

If the feeler is lowered again to the minimum "b" found before the source 19 is caused to emit a fourth predetermined visual signal, for example a green fixed light informing the operator that the feeler is on the acquired lowest position. Should the feeler 18 go lower than the estimated minimum value, the temporary lowest position and the threshold are consequently updated. During the updating period, the electronic control unit can drive the multi-chromatic light-emitting device 19 for continuously emitting the fourth pre-defined signal or another specific signal (e.g. a blinking green light). In case a new minimum position is reached, the electronic control device causes the multi chromatic light-emitting device to emit first signal or signals, including acoustic and tactile cues, if programmed, and the cycle restarts.

At the end of the time interval I-II, the extrema-computing algorithm immediately determines the lowest position being the temporary lowest position.

In the same exemplary case, upon the determination of the lowest position, the operator activates the real-time maximum measure mode at Time II for carrying out again the same search operation to find the upper extrema of the hole 31.

The extrema-computing algorithm starts immediately to analyze each incoming feeler position 200 for determining the highest position 202.

The same or equivalent steps occur when the computing unit is required to determine the highest point of the inner surface of the bore 31 The extrema-computing algorithm determines a temporary highest position that is continuously updated up to time "f" when the feeler reaches the local maximum 202. The multi chromatic light-emitting device 19 is driven to emit the first predefined signal, a threshold 211 is determined based on the value of the highest position, for example by subtracting a predefined value from the maximum value, and the light source emits suitable signals according to whether the feeler is at the maximum value, between maximum value and threshold, or below the threshold. Preferably, the same first, second and third signal as for the search of a minimum are used. Should the feeler move above the current maximum, the temporary highest position 202, then threshold 211 will be updated. The update may be signaled as described for the minimum measure mode.

Once the real-time maximum measure mode is disabled (e.g. at Time III of FIG. 2), the extrema-computing algorithm immediately determines the highest position being the temporary highest position.

Figure 5:
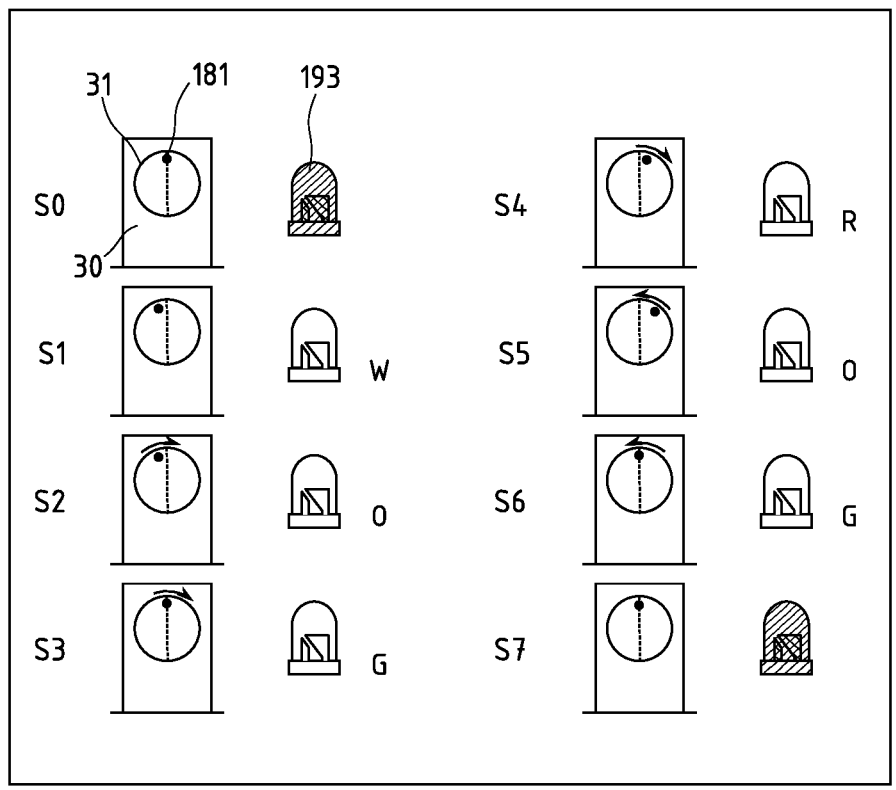
FIGS. 5 and 6 show exemplary measuring procedures of a cusp point of a workpiece by means of the height gauge of the invention.
Figure 6:
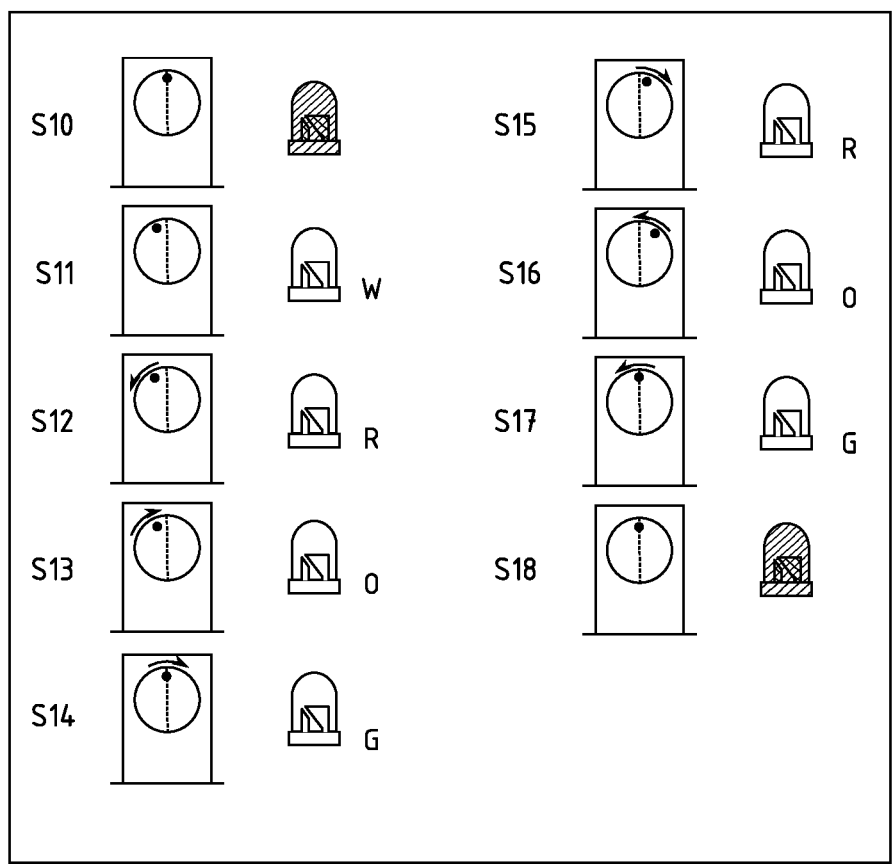

As previously described, the height gauge of the invention may have an operation mode in which the multi-chromatic source is driven based on the direction of a movement of the feeler with respect to an extremal position (FIGS. 5 and 6).

FIG. 5 illustrates an example in which the operator is searching a maximum point on a workpiece 30, notably the height of the highest point of the bore 31.

When the operator activates the real-time maximal measure mode by pressing a button or key of the user interface, the electronic control device drives the touch element 181 of the feeler upwards via the moveable element and the actuator (S0). The electronic control device switches off the multi-chromatic light-emitting device.

The electronic control device stops the upward movement of the feeler upon contact between the touch element 181 and the surface (S1). The electronic control device drives the multi-chromatic light-emitting device for irradiating a white light "w". For the sake of clarity, each step (S0-S7, S10-S18) of FIGS. 5 and 6 shows a single LED 193 accompanied by a one-letter indicator for representing a light irradiated by the multi-chromatic light-emitting device ("r" for red, "o" for orange, "g" for green and "w" for white).

The operator moves the workpiece relative to the height gauge causing a vertical movement of the feeler (S2) that is immediately detected by the electronic control device. The movement of the feeler towards a new highest position, i.e. a new temporary highest position, is indicated to the operator by a visual signal from the source 19, for example, an orange light "o".

In the example, a first color (green) is used to indicate an extremal point, a second color (orange) an approach towards an extremal point, and a third color (red) the motion away from an extremal point. Other colors and combinations of colors codes can be chosen, but a consistent choice of color and signals is advantageous in that the resulting code is easier to memorize.

In this mode, locating an extremal point is particularly easy, as shown in FIGS. 5 and 6. Once the probe has reached and passed the point of maximum height (S3), the feeler will detect whether the feeler is moving towards the maximum or away from it, and will light the indicator 19 orange, or respectively red, or green when the maximum is reached. To reach the maximum, the operator has simply to invert the direction when the light is red, continue when it is orange, until the indicator is green. The green light is preferably underlined by an acoustic signal and/or by a tactile stimulation. The probe reaches the maximum vertical point of the workpiece hole (S3). As soon as the next position of the feeler is acquired (S4), the electronic control device detects that the feeler is moving away from the temporary maximal position. The multi-chromatic light-emitting device is then driven to change the color of the emitted light, e.g. from orange to red "r".

The measure of the bore diameter requires the determination of the second extremum, i.e. a minimum if the maximum was determined first. The minimum determination proceeds similarly to the search for a maximum FIG. 6 illustrates another sequence of events in the search for the maximum point. After contact with the sides of the hole (S11) the operator moves the workpiece to the right in the figure, which causes the feeler to move away from the temporary maximum and which in turn causes the light to change from white to red. The operator is thereby cued to reverse the direction of motion of the workpiece.

In addition to real-time extrema measurements, the multi-chromatic light-emitting device is most useful in positioning the workpiece with respect to the height gauge such that the feeler is in the minimum or maximum position of a borehole. The operator can achieve this positioning much faster using the color cues of the light source than by monitoring the measured values on the displaying device. The operator can then make a straightforward measurement of the diameter by moving the feeler vertically up or down, to the other extremity, without moving the workpiece or the height gauge.

Positioning the feeler at the extremum position also gives the possibility to the operator to search for additional extrema in the vicinity of the one found. Moving the workpiece "in" or "out" along the direction parallel to the feeler allows to ascertain that the measured extremum is independent of the depth at which it is measured. Local deformations of the borehole from a cylindrical shape can also be detected in this manner thereby a more reliable diameter measurement is achieved.

In addition to the extrema-finding cues, the multi chromatic light-emitting device can be caused to display other information like:
calibration procedures, status and recalibration intervals;
tolerance conformities, such as an out-of-tolerance measure;
operational status of the height gauge, such as the height gauge is in a network powered mode, a stand-by mode, or is in a low/high battery powered mode;
Internal errors or malfunction of the height gauge. The light 19 may be used for inviting the operator to check the touch-screen of the user interface for a message of non-conformity (e.g. a detection of a high temperature of the height gauge or of the environment causing an out-of-calibration situation) or of an operational error (e.g. a detection of a too fast movement of the feeler causing an out-of-calibration situation).

LIST OF REFERENCE NUMERALS 1 height gauge
10 Casing
11 Column
111 Vertical guide
12 moveable member
13 actuator
131 Pulley
132 Band
14 electronic control unit
15 position encoder
16 user interface
161 displaying unit
162 keyboard
17 Feeler support
171 Support element
18 Feeler
20 Temperature sensor
27 rotary knob
181, 181' Contact ball
182, 182' Stylus
183, 183' Connector
19 light-emitting device
191 Semi-transparent portion
192 Semi-transparent ring
193 Light source
200 Feeler motion
201 Minimum of the Time interval I-II
202 Maximum of the Time interval II-III
210 Threshold with respect to the Minimum of the Time interval I-II
211 Threshold with respect to the Maximum of the Time interval II-III
220,221 Direction of the feeler at times $T_g$ and $T_h$
a-h Position of the feeler at times $T_{a-h}$
30 Workpiece
31 Borehole
40 Reference surface
S0-S7 Exemplary measure steps
S10-S18 Exemplary measure steps
W, R, O, G White, Red, Orange, Green light

The invention claimed is:

1. A height gauge, comprising:
a base for resting on a horizontal surface;
a vertical guide rigidly attached to the base;
a moveable member slideably mounted on the vertical guide;
a feeler mounted on the moveable member for detecting a contact with a workpiece on the horizontal surface; and
a position encoder feeding the electronic control unit with a signal representing a position of the feeler on the vertical guide;
characterized by
a multi-chromatic light-emitting device mounted on the moveable member and controlled by the electronic control unit;
the electronic control unit being arranged to detect an extremal position in a motion of the feeler relative to the vertical guide and to drive the light-emitting device based on the position of the feeler.

2. The height gauge of claim 1, wherein an actuator drives the moveable member along the vertical guide under control of an electronic control unit.

3. The height gauge of claim 1, wherein the electronic control unit is arranged to drive the light-emitting device based on a vertical distance between the position of feeler and the extremal position.

4. The height gauge of claim 1, wherein the electronic control unit is arranged to drive the light-emitting device based on a direction of a movement of the feeler with respect to the extremal position.

5. The height gauge of claim 1, wherein the electronic control unit is arranged to drive the multi-chromatic light-emitting device for modifying spectral distributions and/or intensities of an emitted light and/or time dependency of the emitted light.

6. The height gauge of claim 1, wherein the feeler comprises a force sensor configured to feed the electronic control unit with a signal representing a vertical magnitude of a force acting on a distal portion of the feeler.

7. The height gauge of claim 6, wherein the electronic control unit has a constant-force mode in which it is configured to move the feeler via the actuator in such a way as to maintain the magnitude of said force acting on a distal portion of the feeler within a predefined range.

8. The height gauge of claim 1, wherein the multi chromatic light-emitting device is capable to emit a first light perceived as red, a second light perceived as orange, a third light perceived as green and a fourth light perceived as white.

9. The height gauge of claim 1, wherein the multi chromatic light-emitting device is configured to illuminate at least a portion of the feeler.

10. The height gauge of claim 1, wherein the feeler has a touch element arranged for contacting the workpiece that is at least partially transparent; the multi-chromatic light-emitting device being placed in the feeler such that its emitted light is visible through the touch element.

11. The height gauge of claim 1, wherein the feeler is removeably attached to the movable member by means of a connector that comprises an indicator element that is at least partially transparent; the multi-chromatic light-emitting device being placed in the connector such that its emitted light is visible through the indicator element.

12. The height gauge of claim 1, wherein a rotatable temperature sensor is installed on the moveable member or the feeler support to measure the temperature of the instrument and of the workpiece.

13. The height gauge of claim 1, including an electric actuator arranged for driving the feeler support along the vertical guide.

* * * * *